(12) United States Patent
Tsuda et al.

(10) Patent No.: US 10,105,848 B2
(45) Date of Patent: Oct. 23, 2018

(54) MACHINE THAT STOPS MOVEMENT OF MEMBER ON DRIVE AXIS DUE TO ABNORMALITY IN BRAKE

(71) Applicant: FANUC CORPORATION, Yamanashi (JP)

(72) Inventors: Taketsugu Tsuda, Yamanashi (JP); Yoshiki Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 218 days.

(21) Appl. No.: 15/246,634

(22) Filed: Aug. 25, 2016

(65) Prior Publication Data

US 2017/0057089 A1  Mar. 2, 2017

(30) Foreign Application Priority Data

Sep. 1, 2015 (JP) .................................. 2015-172059

(51) Int. Cl.
*G06F 19/00* (2018.01)
*B25J 9/16* (2006.01)
*G05B 19/406* (2006.01)

(52) U.S. Cl.
CPC .......... *B25J 9/1674* (2013.01); *G05B 19/406* (2013.01); *G05B 2219/41279* (2013.01)

(58) Field of Classification Search
CPC ................. B25J 9/1674; G05B 19/406; G05B 2219/41279
USPC ........................................................ 700/245
See application file for complete search history.

(56) References Cited

U.S. PATENT DOCUMENTS

| 3,453,549 A * | 7/1969 | Payne .................. G05B 19/238 318/572 |
| 4,071,896 A * | 1/1978 | Boyer, III ............ G05B 19/188 700/127 |
| 5,453,931 A * | 9/1995 | Watts, Jr. ............. G05D 1/0231 180/168 |
| 9,943,968 B2 * | 4/2018 | Geiler .................. B25J 19/0004 |
| 9,955,627 B2 * | 5/2018 | Nakano ................ A01D 34/828 |

(Continued)

FOREIGN PATENT DOCUMENTS

| JP | 1295793 A | 11/1989 |
| JP | 739190 A | 2/1995 |

(Continued)

OTHER PUBLICATIONS

English Abstract and Machine Translation for Japanese Publication No. 5444421 B2, published Aug. 19, 2014, 17 pgs.

(Continued)

*Primary Examiner* — Ronnie M Mancho
(74) *Attorney, Agent, or Firm* — Fredrikson & Byron, P.A.

(57) ABSTRACT

A robot includes a motor that includes a brake and moves an arm on a drive axis, and a rotational position detector that detects movement of the arm. When a state occurs in which the robot is preferably emergency-stopped, a control device performs an emergency stop control in which the brake is operated and power supply to the motor is interrupted. When the movement of the arm is detected based on an output of the rotational position detector during the emergency stop control, the control device supplies power to the motor to prevent the movement of the arm.

3 Claims, 5 Drawing Sheets

(56) References Cited

U.S. PATENT DOCUMENTS

| | | | | |
|---|---|---|---|---|
| 2004/0111183 A1* | 6/2004 | Sutherland | ............ | A61B 90/25 |
| | | | | 700/245 |
| 2008/0150467 A1* | 6/2008 | Hashimoto | ............ | B25J 9/1676 |
| | | | | 318/568.17 |
| 2014/0000355 A1* | 1/2014 | Shikagawa | ............ | G01M 13/00 |
| | | | | 73/118.01 |
| 2016/0021819 A1* | 1/2016 | Nakano | ................. | A01G 3/062 |
| | | | | 30/276 |

FOREIGN PATENT DOCUMENTS

| | | | |
|---|---|---|---|
| JP | 2009245007 A | 10/2009 | |
| JP | 2012213844 A | 11/2012 | |
| JP | 201410546 A | 1/2014 | |
| JP | 5444421 B2 | 3/2014 | |

OTHER PUBLICATIONS

English Abstract and Machine Translation for Japanese Publication No. 2014-010546 A, published Jan. 20, 2014, 15 pgs.
English Abstract and Machine Translation for Japanese Publication No. 2012-213844 A, published Nov. 8, 2012, 22 pgs.
English Abstract and Machine Translation for Japanese Publication No. JPH07-039190 A, published Feb. 7, 1995, 7 pgs.
English Abstract and Machine Translation for Japanese Publication No. JPH01-295793 A, published Nov. 29, 1989, 5 pgs.
English Abstract and Machine Translation for Japanese Publication No. 2009-245007 A, published Oct. 22, 2009, 14 pgs.

* cited by examiner

MACHINE THAT STOPS MOVEMENT OF MEMBER ON DRIVE AXIS DUE TO ABNORMALITY IN BRAKE

BACKGROUND OF THE INVENTION

1. Field of the Invention

The present invention relates to a machine that includes a motor including a brake.

2. Description of the Related Art

A machine, such as an industrial robot, machine tool or the like, includes a drive axis for moving a member in a predetermined direction. For example, the robot includes a drive axis for driving an arm. A joint unit between arms of the robot corresponds to the drive axis. A change in angle between the arms at the joint unit causes a change in position and posture of the robot. Further, in the machine tool, a workpiece and a tool are moved on a predetermined drive axis, so that the position of the tool with respect to the workpiece is changed.

Such a member that moves on the drive axis is driven by a motor. The motor is provided with a brake to prevent rotation of an output shaft of the motor. When power supply to the motor is interrupted, the brake operates to maintain the position and posture of the robot or the position and posture of a tool or table of the machine tool.

Japanese Patent No. 5444421 discloses a brake abnormality diagnosis method for diagnosing an abnormality in a brake for a motor provided in a robot. In a state in which the motor is excited and the brake is operating, there is a case where it is diagnosed that there is an abnormality in the brake. In this brake abnormality diagnosis method, when it is diagnosed that there is an abnormality in the brake, the abnormality in the brake is notified without interrupting the excitation of the motor and releasing the brake.

An example of a drive axis on which gravity acts includes the drive axes of the machine. For example, the drive axis of the joint unit of the arm of the robot is subjected to a force with which the arm is moved downward in a vertical direction due to the weight of the arm. When the brake fails, the braking force of the brake is decreased. For example, when a material such as grease or oil adheres to a friction plate of a brake included in a motor, the braking force of the brake is decreased. When the braking force of the brake is decreased, there is a case in which the drive axis on which gravity acts is actuated when the excitation of the motor is interrupted.

In particular, when a situation occurs in which the robot or the like should be stopped urgently so that an emergency stop of the robot is performed, the excitation of the motor is interrupted. However, when the brake is in failure, there is a case in which the posture when stopped can no longer be maintained so that the position of a part of the arm is lowered.

In the method disclosed in the above Japanese Patent No. 5444421, it is possible to regularly perform abnormality diagnosis in a state in which power is supplied to the motor. However, when the brake is in failure immediately after no abnormality is detected in regular diagnosis, the power supply to the motor would be interrupted, and therefore, there would be a possibility that the position and posture of the robot is changed.

SUMMARY OF THE INVENTION

The machine of an aspect of the present invention includes a brake, and a motor that moves a predetermined member on a drive axis. The machine includes a state detector that detects movement of the member on the drive axis, and a control device that controls the brake and the motor. The control device performs an emergency stop control in which the brake is operated and power supply to the motor is interrupted to maintain a stopped position of the member. When movement of the member on the drive axis is detected based on an output of the state detector during the emergency stop control, the control device supplies power to the motor to prevent the movement of the member.

In the above present invention, the state detector may be a rotational position detector that detects a rotational position and a rotational speed of the motor. The control device can monitor that the position of the member on the drive axis is maintained, based on an output of the rotational position detector during the emergency stop control.

In the above present invention, the control device can monitor that the member is moved to a predetermined safe retracted position and the position of the member is maintained after power is supplied to the motor so as to prevent the movement of the member.

DETAILED DESCRIPTION

Referring to FIGS. 1 to 6, description will be made of the machine in the embodiment. The machine in the present embodiment includes a motor for moving a predetermined member on a drive axis. First, description is made exemplifying a robot system as the machine including a motor.

Figure 1:
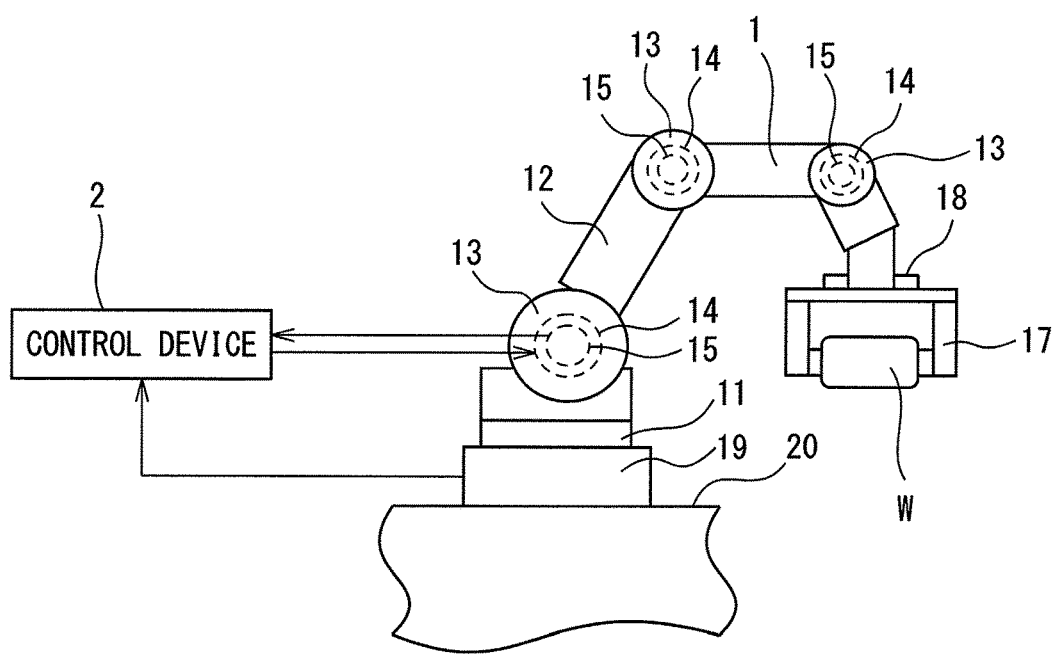
FIG. 1 is a schematic view of a robot system in an embodiment.

FIG. 1 is a schematic view of the robot system in the present embodiment. The robot system includes a robot 1 that transports a workpiece W, and a control device 2 as a robot control device that controls the robot 1. The robot 1 of the present embodiment is an articulated robot including an arm 12 and a plurality of joint units 13.

The robot 1 includes an arm drive device that drives the respective joint units 13. The arm drive device includes a motor 14 disposed within each joint unit 13. The arm 12 can be directed in a desired direction at the joint unit 13 by being driven by the motor 14. The robot 1 includes a base unit 19 that supports the arm 12, and a rotary unit 11 that rotates relative to the base unit 19. The base unit 19 is fixed to an installation surface 20. The rotary unit 11 rotates about a drive axis extending vertically.

A hand 17 has the functions of gripping and releasing the workpiece W. The robot 1 includes a hand drive device that closes and opens the hand 17. The hand drive device of the present embodiment includes a hand drive cylinder 18 for pneumatically driving the hand 17.

The robot 1 includes a state detector that detects movement of a predetermined member on the drive axis. In the robot 1 illustrated in FIG. 1, the arm 12 corresponds to the predetermined member. The state detector detects position and posture of the robot 1. The state detector in the present embodiment includes a rotational position detector 15 attached to each motor 14. The rotational position detector 15 detects a rotational position when the motor 14 drives. Further, the rotational position detector 15 can detect a rotational speed based on the rotational position. An angle of the arm 12 at the joint unit 13 can be detected based on the rotational position of each motor 14.

Figure 2:
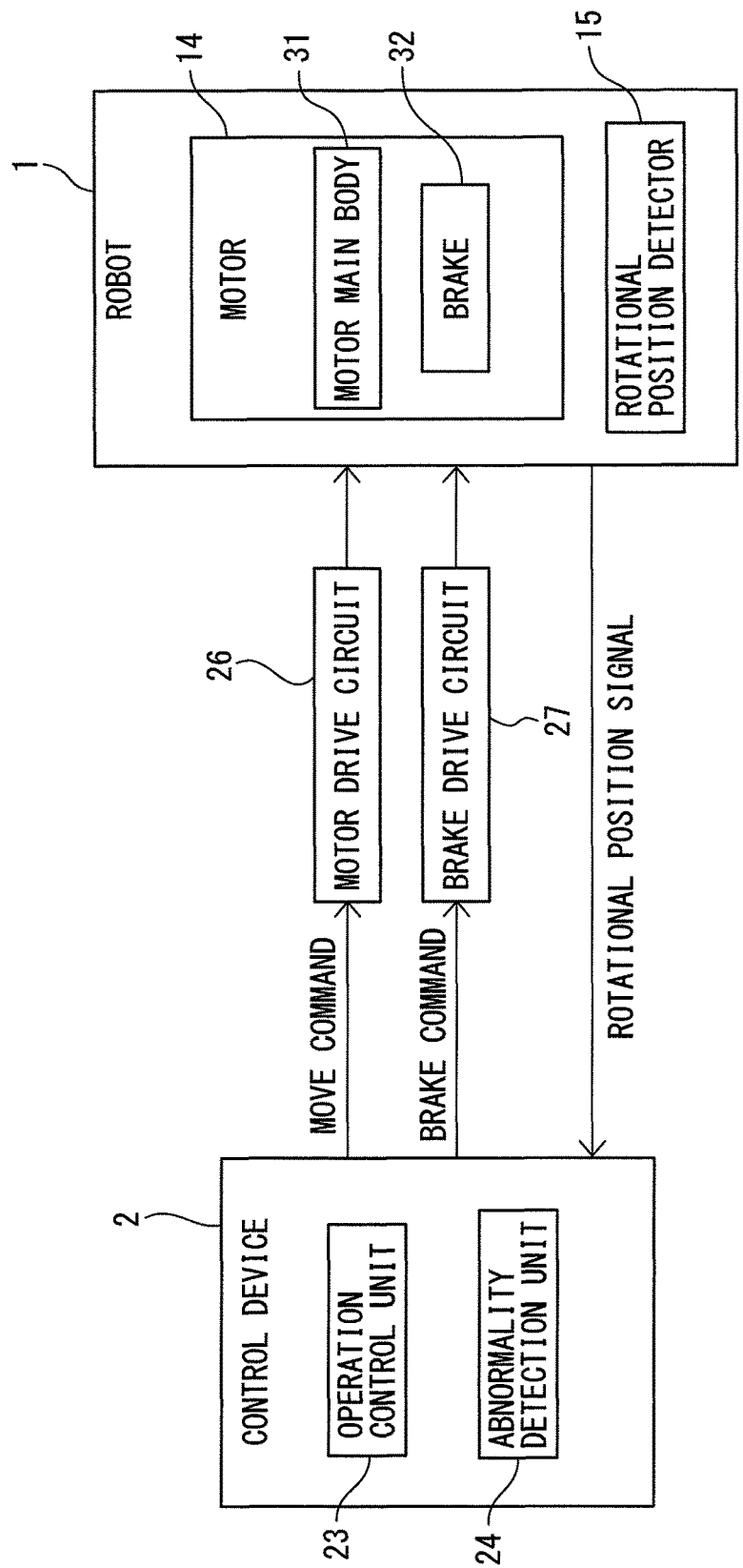
FIG. 2 is a block diagram of robot system in the embodiment.

In FIG. 2, there is illustrated a block diagram of the robot system in the present embodiment. Referring to FIGS. 1 and 2, the motor 14 includes a motor main body 31 including a rotary shaft, a rotor fixed to the rotary shaft, and a stator. The motor 14 includes a brake 32 that brakes rotation of the rotary shaft of the motor main body 31. The brake 32 of the present embodiment is configured to cause a friction plate to contact with the rotary shaft of the motor main body 31, thereby reducing the number of revolutions. The brake 32 is not limited to this form but may use any mechanism that restrains movement of a member on the drive axis.

The robot 1 drives based on an operation command of the control device 2. The arm drive device and the hand drive device are controlled by the control device 2. The control device 2 is constituted by an arithmetic processing unit including a CPU (Central Processing Unit), a RAM (Random Access Memory), a ROM (Read Only Memory), and the like, which are connected to each other via a bus. The control device 2 includes an operation control unit 23 that controls the motor 14. The operation control unit 23 in the present embodiment controls the operation of the motor main body 31 and the operation of the brake 32.

The operation control unit 23 sends a move command to a motor drive circuit 26. The motor drive circuit 26 includes an electric circuit to supply a current. The motor drive circuit 26 supplies a current based on the move command to the motor main body 31. Further, the operation control unit 23 sends a brake command to a brake drive circuit 27. The brake drive circuit 27 includes an electric circuit to supply a current. The brake drive circuit 27 supplies a current based on the brake command to the brake 32. Further, the control device 2 receives a signal related to a rotational position, which is outputted from the rotational position detector 15.

The control device 2 in the present embodiment is configured to stop the robot 1 when a stop signal for the robot 1 is detected. Among stops of the robot 1 is included a normal stop in which the robot is stopped in accordance with an operation program. Further, among stops of the robot 1 is included an emergency stop for ensuring safety of the operator and robot.

The control device 2 causes the robot 1 to stop instantly when a state occurs in which an emergence stop is to be made. For example, as a result of the operator depressing an emergency stop button, the control device 2 detects an emergency stop signal. Further, there is a case in which a fence is provided to secure an operation area for the robot 1 around the robot 1. When the fence is opened during automatic operation of the robot 1, the control device 2 detects an emergency stop signal. Alternatively, when the robot 1 detects a failure, the control device 2 detects an emergency stop signal. Alternatively, in a robot system in which a communication device is provided which enables communication between the robot 1 and an external device, there is a case in which the control device 2 detects an emergency stop signal from the external device.

The control device 2 performs emergency stop control when such an emergency stop signal is detected. The control device 2 includes an abnormality detection unit 24 that detects an abnormality in the machine and an abnormality in an environment around the machine. Upon receipt of an emergency stop signal, the abnormality detection unit 24 determines that it is a state in which an emergency stop is preferably performed. Further, also when a failure of the control device 2 occurs or the like, the abnormality detection unit 24 determines that it is a state in which an emergency stop is preferably performed. The abnormality detection unit 24 sends a command to perform an emergency stop control to the operation control unit 23.

In the emergency stop control, the operation control unit 23 outputs a move command that is initially zero. The robot 1 stops in the position and posture when the command is received. Then, the operation control unit 23 actuates the brake 32 of the motor 14. The rotary shaft of the motor 14 is fixed. Subsequently, the operation control unit 23 stops the motor main body 31 by interrupting the supply of power to the motor main body 31. In the emergency stop control, the state in which the member is stopped on the drive axis is maintained due to a braking force of the brake 32 without driving the motor main body 31. In this manner, the robot 1 is maintained in the position and posture when it is stopped.

However, when an abnormality such as failure occurs in the brake 32, the braking force of the brake 32 is decreased. A force of gravity acts on the robot 1 at all times. For example, a force of gravity acts on the arm 12 and the joint units 13, which corresponds to their own weight. In other words, the robot 1 is subjected to the force of gravity due to its own weight. Alternatively, when the hand 17 is gripping the workpiece W, the robot 1 is subjected to a force of gravity corresponding to the weight of the workpiece W.

Figure 3:
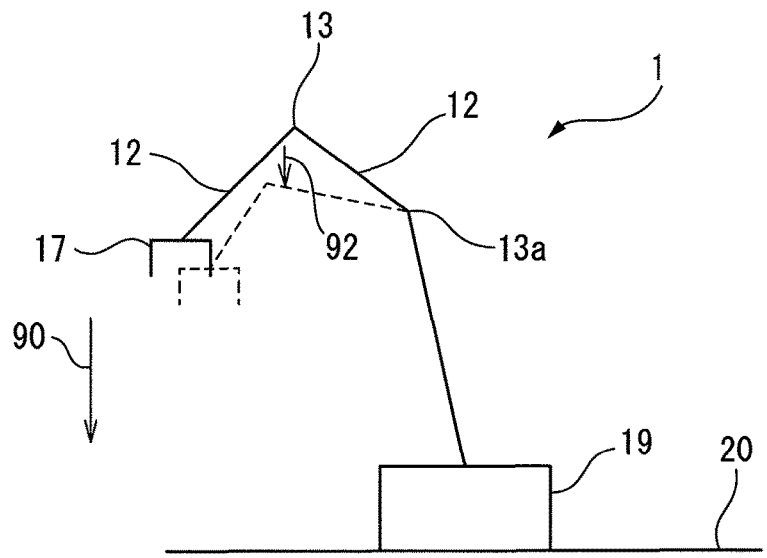
FIG. 3 is a schematic view illustrating movement of the arms of a robot due to gravity.

In FIG. 3, there is illustrated a schematic view of the robot for explaining a state when the braking force of the brake is decreased. The force of gravity acts in the direction indicated by an arrow 90. The drive axis disposed in each joint unit 13 is subjected to a force of gravity. The drive axis on which such a force of gravity acts is referred to as gravity axis. Upon decrease in the braking force of the brake 32, the arm 12 and the hand 17 is moved downward due to the own weights of the arm 12, the joint units 13 and the like. Particularly, the arm 12 between from the joint unit 13 in which is provided the motor 14 for which the braking force of the brake 32 is decreased to the hand 17 is moved downward in the vertical direction as indicated by an arrow 92.

In the example illustrated in FIG. 3, the brake 32 for the motor 14 disposed in the joint unit 13a has failed. Further, the arm 12 at the side where the hand 17 is disposed is lower in position than the joint unit 13a. When the brake 32 fails, the position of the workpiece W becomes lower over time. In the present embodiment, control is performed to prevent the arm 12 from being lowered in position.

The control device 2 in the present embodiment detects a movement on the drive axis based on the output of the rotational position detector 15 during an emergency stop control. Further, the abnormality detection unit 24 of the control device 2 sends a command to supply power to the motor 14 to the operation control unit 23 when a movement on the drive axis is detected.

The operation control unit 23 restarts supply of power to the motor main body 31. Then, the operation control unit 23 supplies power to the motor main body 31 so as to maintain the position of the arm 12 when stopped on the drive axis. In the example illustrated in FIG. 3, since the arm 12 is lowered in position, power is supplied to the motor 14 disposed in the joint unit 13a so as to prevent the arm 12 from being lowered in position. The operation control unit 23 controls to maintain the stopped position on the drive axis of the joint unit 13a.

The control device 2 in the present embodiment makes it possible, even if an abnormality occurs in the brake 32, to maintain a safe posture of the robot 1 when a state occurs in which an emergency stop is preferably performed. Alternatively, it is possible to allow the workpiece W and the hand 17 to be stopped at a safe position irrespective of occurrence of an abnormality in the brake 32.

Figure 4:
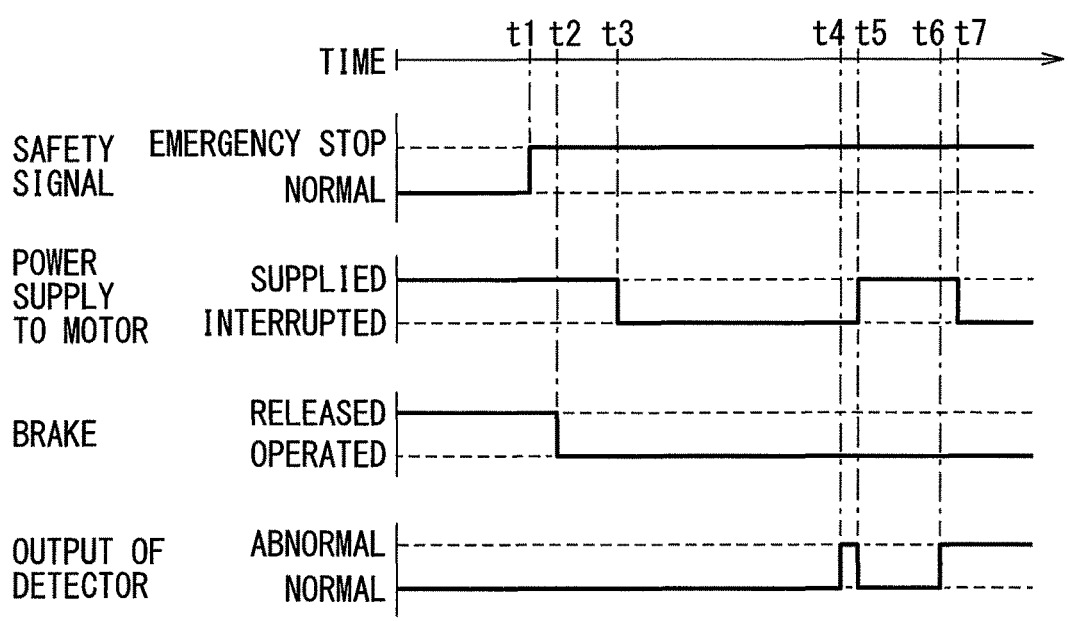
FIG. 4 is a time chart for control of a machine in the embodiment.

In FIG. 4, there is illustrated a time chart of control of the machine in the present embodiment. Referring to FIGS. 2 and 4, the robot 1 is performing a normal operation until a time t1. For example, automatic driving is performed based on a predetermined operation program.

At the time t1, the abnormality detection unit 24 of the control device 2 detects an emergency stop signal. The operation control unit 23 performs an emergency stop control. The operation control unit 23 stops movement of the arm 12 of the robot 1. Power is supplied to the motor 14, so that the position and posture of the robot 1 when stopped are maintained. At a time t2 later than the time t1, the operation control unit 23 changes the brake 32 from the released state to the operating state. In other words, the brake 32 is caused to operate. At a time t3, the operation control unit 23 stops the motor 14. In other words, the supply of power to the motor main body 31 is interrupted.

However, at a time t4, the position detected by the rotational position detector 15 is changed from normal position to abnormal position. The abnormality detection unit 24 detects that the arm 12 has moved in a downward direction from the stopped position. For example, the abnormality detection unit 24 detects that the rotational angle of the motor 14 has changed from the stopped position and beyond a predetermined determination value.

At a time t5, the operation control unit 23 changes the operation state of the motor main body 31 from the stopping state to the driving state. In other words, the operation control unit 23 drives the motor main body 31 again and thereby maintains the position and posture of the robot 1.

In the example illustrated in FIG. 4, from the time t5 onward, the operation control unit 23 maintains the position and posture of the robot after the arm 12 is slightly moved as a result of the braking force of the brake 32 being decreased. The control of the motor 14 is not limited to this form, and the operation control unit 23 may control the motor 14 in such a manner as to return the arm 12 to a position before it is slightly moved. Alternatively, the operation control unit 23 may control the motor 14 in such a manner as to move a member to a predetermined safe retracted position and maintain the position of the member.

In this manner, the robot system in the present embodiment can maintain a safe position and posture of the robot irrespective of occurrence of an abnormality in the brake.

The rotational position detector 15 of the present embodiment can detect a rotational speed of the motor 14 in addition to a rotational position of the motor 14. The rotational position detector 15 can detect an angle of rotation of the rotary shaft of the motor 14, i.e., a rotational position of the motor 14. Based on the rotational position of the motor 14, it is possible to calculate a differential of the angle of rotation per unit time, i.e., a rotational speed.

The abnormality detection unit 24 of the present embodiment can monitor, during an emergency stop control, that the position of the arm 12 on the drive axis is maintained, based on the rotational position of the motor 14 detected from the output of the rotational position detector 15 or the rotational speed of the motor 14. Particularly, during the period from the time t5 onward, it is possible to monitor that the position of the arm 12 on the drive axis is maintained. Regarding the rotational position of the motor 14, the abnormality detection unit 24 monitors that the rotational position of the motor 14 is not moved. Further, regarding the rotational speed of the motor 14, the abnormality detection unit 24 monitors that the rotational speed of the motor 14 is zero.

When at least one of the rotational position and the rotational speed of the motor 14 is abnormal, at the time t5, a control can be performed to supply power to the motor main body 31. Further, at a time t6, when an abnormality occurs with respect to the rotational position and the rotational speed of the motor 14, an arbitrary control can be performed while displaying a warning notice on a display unit of the control device 2, for example. The arbitrary control is a control to interrupt power supply to the motor main body 31 at a time t7 as illustrated in FIG. 4, for example. In this manner, even after power supply to the motor main body 31 is restarted, it is possible to maintain a safe position and posture by monitoring the rotational position and the rotational speed of the motor 14. When it becomes a state in which an abnormality occurs with respect to the rotational position and the rotational speed of the motor 14 so that a safe position and posture can no longer be maintained, it is possible to transit to a safe state by performing the arbitrary control or the like while displaying the warning notice.

Figure 5:
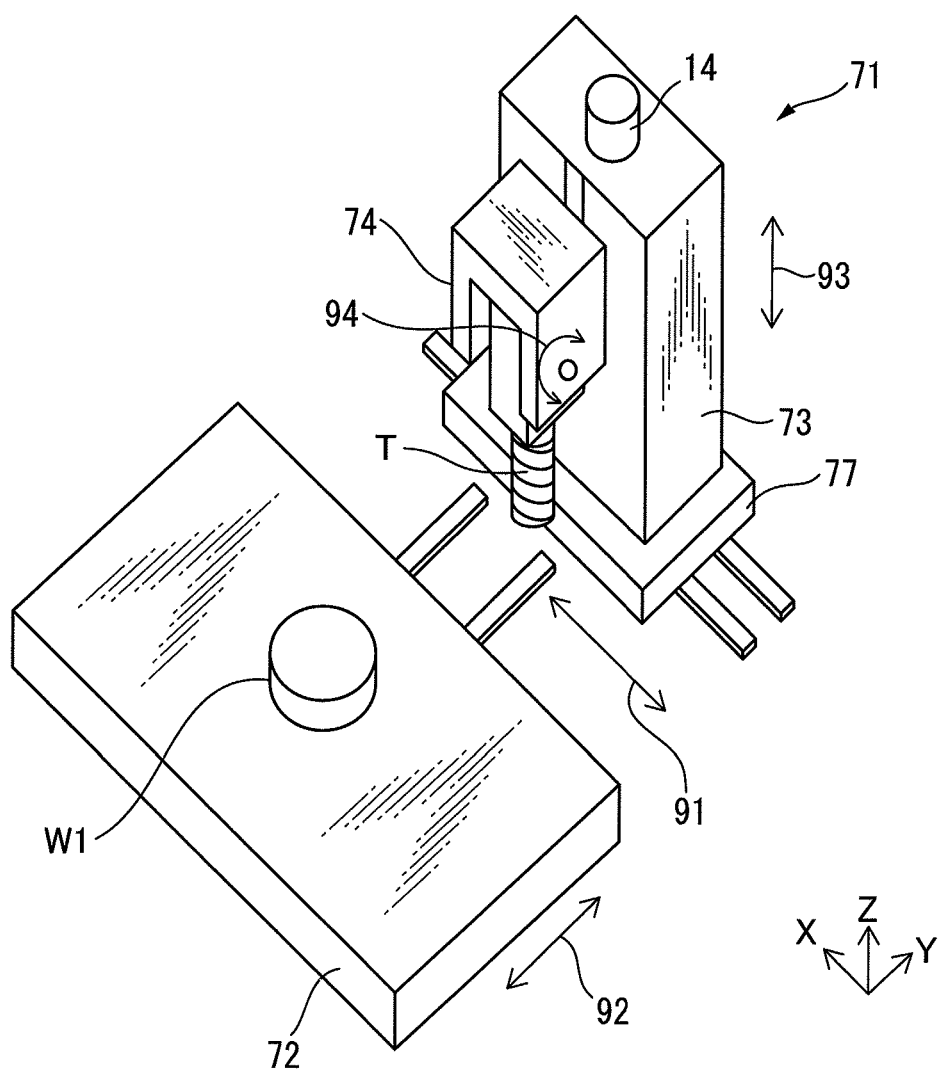
FIG. 5 is a schematic view of a machine tool in the embodiment.

Next, a machine tool is exemplified as a machine with a motor. FIG. 5 is a schematic view of the machine tool in the present embodiment. In the present embodiment, description is made, by way of example, of the machine tool 71 having a plurality of drive axes. The machine tool 71 includes a table 72 on which a workpiece W1 is fixed, and a base 77. The machine tool 71 includes a support column 73 secured to the base 77. The machine tool 71 includes a head 74 that is movable with respect to the support column 73 in the directions indicated by arrows 93. A tool T is supported at the head 74.

The machine tool 71 of the present embodiment is of the numerical control type. The machine tool 71 includes a drive device that changes a relative position and posture of the tool T with respect to the workpiece W1. The drive device of the present embodiment moves the base 77 in X-axis directions indicated by arrows 91. The drive device moves the table 72 in Y-axis directions indicated by arrows 92. The drive device moves the head 74 in Z-axis directions indicated by arrows 93. Further, the drive device rotates the tool T with respect to the head 74 about A axis as indicated by arrows 94. These three linear-motion axes (X axis, Y axis, and Z axis) and one rotation axis (A axis) correspond to the drive axes.

The drive device includes a motor for moving a predetermined member on each drive axis. For example, the drive device includes a motor 14 for driving the head 74 with respect to support column 73 in the Z-axis directions. The motor 14 corresponding to each drive axis includes a brake 32 for braking rotation of a rotary shaft. Further, a rotational position detector 15, which serves as a state detector, is attached to the motor 14.

The control of the present embodiment can also be performed with respect to a motor for moving a member such as head or the like on a drive axis of a machine tool. The configuration of the control device of the machine tool is similar to the robot system illustrated in FIG. 2. A control device 2 includes an operation control unit 23 and an abnormality detection unit 24. The operation control unit 23 controls a relative position and posture of a tool T with respect to a workpiece W1. The workpiece W1 is machined while changing the relative position and posture by the drive device. A motor main body 31 is controlled by the operation control unit 23 via a motor drive circuit 26. A brake 32 is controlled by the operation control unit 23 via a brake drive circuit 27.

The machine tool 71 can automatically perform machining in accordance with a predetermined operation program. The control device 2 performs an emergency stop control when a state occurs in which an emergency stop is preferably performed. Then, a case occurs, in which the braking force of the brake is decreased due to a failure of the brake or the like.

Figure 6:
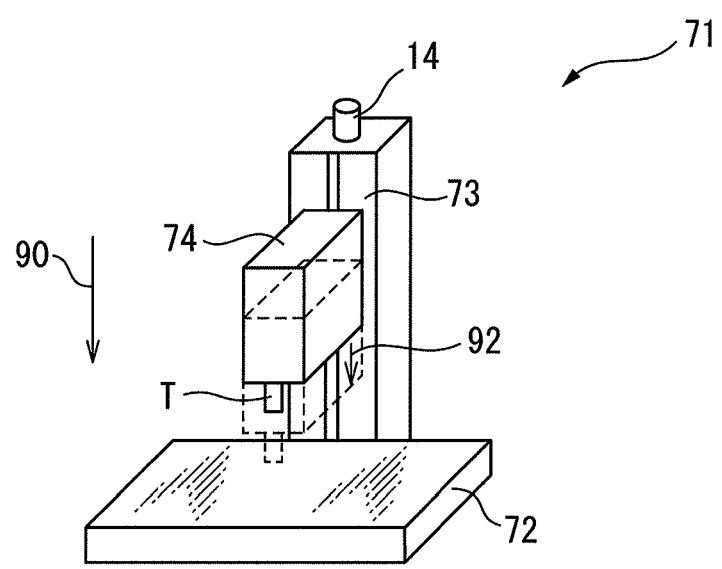
FIG. 6 is a schematic view for explaining movement of a head of the machine tool due to gravity.

In FIG. 6, there is illustrated a schematic view of the machine tool for explaining a state in which the braking force of the brake is decreased. In the machine tool 71 as well, gravity acts as indicated by an arrow 90. For example, gravity acts on the drive axis for driving the head 74 in the Z-axis directions with respect to the support column 73. When the braking force of the brake is decreased, the position of the head 74 is gradually lowered during an emergency stop control. The control device 2 detects movement of the head 74 on the Z axis based on the output of the rotational position detector 15 attached to the Z-axis motor 14. In this instance, the control device 2 can perform a control to supply power to the Z-axis motor 14 so as to prevent the movement of the head 74.

In this manner, with the machine tool, too, it is possible to perform a control at a stop time, which is similar to that of the robot system. The other configuration, operation and effect are similar to those of the robot system described hereinabove.

The state detector in the present embodiment is the rotational position detector attached to each motor 14, but there is no limitation thereto, and the state detector may adopt any detector that is capable of detection movement on the drive axis. For example, when the drive axis is an axis on which linear movement is effected, the state detector may include a linear scale.

While, in the present embodiment, description has been made with the articulated robot and the machine tool exemplified as a machine with motors, there is no limitation thereto, and the present invention is applicable to any machine with motors.

According to the present invention, it is possible to provide a machine in which movement of a member on a drive axis due to an abnormality in the brake is stopped when power supply to a motor is interrupted at a time of emergency stop.

The above-described embodiments may be properly combined with each other. In each of the views described above, identical or equivalent parts are assigned identical reference numerals. The above embodiments are by way of example and do not limit the present invention. Further, the embodiments encompass changes therein set forth in the claims.

The invention claimed is:

1. A machine, comprising:
a motor that comprises a brake and moves a predetermined member on a drive axis;
a state detector that detects movement of the member on the drive axis; and
a control device that controls the brake and the motor,
wherein, when a state occurs in which an emergency stop is to be performed, the control device is adapted to operate the brake and interrupt power supply to the motor to perform an emergency stop control for maintaining a stopped position of the member, and when the movement of the member on the drive axis is detected based on an output of the state detector during the emergency stop control, the control device is adapted to supply power to the motor to prevent the movement of the member.

2. The machine according to claim 1, wherein:
the state detector is a rotational position detector that detects a rotational position and a rotational speed of the motor; and
the control device is adapted to monitor that the position of the member on the drive axis is maintained, based on an output of the rotational position detector during the emergency stop control.

3. The machine according to claim 1, wherein: after power is supplied to the motor so as to prevent the movement of the member, the control device is adapted to move the member to a predetermined safe retracted position and monitor that the position of the member is maintained.

* * * * *